2,861,110

PROCEDURE FOR THE OBTENTION OF HIGHER ALCOHOLS BY CONDENSATION OF LOWER ALCOHOLS

Jean Herzenberg, Guidobaldo Cevidalli, and Adriano Nenz, Milan, Italy, assignors to Sicedison S. p. A., Milan, Italy No Drawing. Application July 17, 1956
Serial No. 598,262

Claims priority, application Italy July 19, 1955

6 Claims. (Cl. 260—642)

It is known that the condensation of two molecules of similar or different lower alcohols, due to the action of an alcoholate leads to the formation of a molecule of a higher alcohol—also known as Guerbert's reaction—and can be carried out either at atmospheric, or at increased pressure. In the last mentioned case increased temperatures, e. g. in the range of 290–310° C., may be employed which are substantially higher than the boiling points of starting alcohols, whereby a substantial increase in the reaction rate can be obtained. This is very important from an operational viewpoint.

The reaction mechanism, which has not yet been wholly elucidated (see a. o. Huecken and Naab, Ber., 64, 2137 (1931)), is unusually intricate, since in the course of one step thereof, as many as four intermediate reactions are involved, and moreover secondary reactions can also interfere therewith. All this may result in the final formation of a water molecule, from the two alcohol molecules which enter the reaction. Thus, the use of dehydrating agents, as e. g. quick lime (see a. o. J. Bolle and L. Bourgeois, C. R. 233, 1467 (1951)) or of easily saponifiable esters—as e. g. the alkylesters of boric acid, as specified in detail in British Patent 655,864, granted August 12, 1948—has been proposed long ago.

The synthesis of 2-ethyl-hexyl alcohol, which is important from the technical viewpoint, may be described as follows: According to the method of British Patent 655,864, in which tributylborate ester is employed as dehydrating agent:

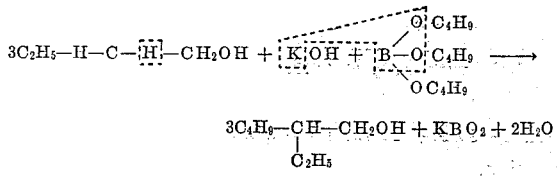

From the above equation it will be seen that the task of butylborate does not consist merely in the absorption of water that is formed in the course of condensation of two butyl alcohol molecules, but also—and principally—in the neutralization of all sodium or potassium hydroxide resulting from the decomposition of alkali alcoholate, as caused by the boric acid yielded by the hydrolysis. Should the last mentioned task not be fully carried out due to the pressure and temperature conditions of the process, an oxydizing action will be exerted by the free alkali hydroxide on the butyric aldehyde which is formed as intermediate product, thereby causing the formation of butyric acid. In such a case, the reaction mechanism is possibly similar to that of Cannizzaro's reaction.

When a molar ratio similar or analogous to that of the preceding example, i. e.:

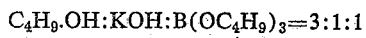

is applied to condensation, a complete neutralization may be obtained, due to the action of released boric acid. Actually, under such conditions, only very little amounts of butyric acid, of the order of 1–2%, and often even smaller than the 1% of theoretical amount, are formed.

Nevertheless, the results which may be obtained according to the above mentioned British patent, cannot be considered as satisfactory, neither from economical, nor from technical viewpoints, due to following reasons:

(1) The conversion of butyl alcohol, and the yields of 2-ethylhexyl alcohol, as calculated on the total butanol, are very low.

When solid KOH, and butyl borate are used, which, according to said British patent, and also according to our own experience show an activity higher than that of boric anhydride, after a reaction time of 5 hrs., a conversion not higher than the 25–29% of n-butyl alcohol, or of n-amyl alcohol will be attained.

Such a conversion has been attained by the use of n-butyl alcohol—KOH—butyl borate, with a molar ratio of 3.3:1:1 (see the aforestated reaction equation).

However, according to our experience, when a molar ratio of 3.3:.5:.5 is used, a conversion of butyl alcohol amounting to only 14% can be attained, and the yield of 2-ethylhexyl alcohol amounts to only 12.3% of the theoretically possible amount, as calculated on the total butanol.

No results of tests carried out with solid NaOH are reported in the aforestated British patent. However, it is stated that the efficiency of such an alkali hydroxide is zero, or at any rate much lower than that of KOH. Such a statement has been substantiated by the results of our own tests.

In effect, by the use of NaOH, the conversion of n-butyl alcohols is decreased down to about 16–20%, depending upon the molar ratios used, and accordingly the yield of 2-ethylhexyl alcohol, as calculated on total butanol, will drop to 13–15% of the theoretically possible amount, while substantial increases in the amounts of butyric acid formed—up to amounts ranging from 3 to 9% of the theoretical value—can be observed.

(2) A very poor reproducibility of results is obtained in the case of a direct action of reactants, since both the yield of 2-ethylhexyl alcohol, and the amount of butyric acid formed range within wide limits, even when the reaction conditions are kept constant as far as possible, and a thorough agitation is applied.

The above drawback is not caused by the occurrence of an heterogeneous reaction between the solid alkali hydroxide and the other reactants, since the reaction proper, which is started only at a temperature higher than 200° C., takes place in homogeneous phase; but instead it is to be traced out to the fact that the alcoholate formation occurs only gradually, and more or less parallel to condensation reaction.

Thus, in the case of butylalcohol condensation, a number of secondary reactions occur, leading to the formation of said butyric acid, and of esters of same acid.

The above drawback is much more serious when NaOH is used in place of KOH, because NaOH is less soluble in the butylalcohol, and, accordingly, a much slower formation of alcoholate occurs.

It has been found according to this invention that the above drawbacks, which make it difficult to carry out the process on a technical scale, can be obviated by the use of an already formed alkali alcoholate in place of the solid alkali hydroxide (NaOH or KOH), and by causing said alcoholate to react with the alcohol and its boric ester.

In such an instance, no need exists to have the alcoholate separated in its chemically pure condition as a matter of fact, it will be sufficient—as e. g. when n-butyl alcohol is to be condensed to 2-ethylhexyl alcohol—to have the finely subdivided and dry KOH (or NaOH)

subjected to an azeotropic distillation in the presence of the required quantity of butyl alcohol, according to conventional system and with a strong agitation, whereby all water which is formed in the course of alcoholate formation, will be distilled-off, as soon as it is released.

Such azeotropic distillation is continued, in a suitable fractionating column, until the distilled-off water corresponds to an alcoholate formation of 85–95% of theoretical value. Then, the suspension of potassium or sodium alcoholate in butyl alcohol thus obtained, can be utilized, as it is, for the subsequent alcohol condensation.

The results obtained by our process, particularly in regard to the conversion of butyl alcohol, and to the yield of 2-ethylhexyl alcohol on total butanol, are much better than those which can be attained according to British Patent No. 655,864, whereby they can exert a decisive influence on the technical and economical value of the procedure.

Through a series of comparative tests, carried out according to both procedures, and keeping absolutely constant all other reaction condition, with the use of both KOH and NaOH, it has been shown that by our procedure—i. e. by the use of an alkali alcoholate formed in advance—the conversation of n-butyl alcohol can be doubled in respect to that obtained according to British Patent No. 655,864, and the yield of 2-ethylhexyl alcohol on total butanol is accordingly increased by two- and even three times.

Thus, by the use of butanol-KOH-butylborate in the molar ratio 3.3:1:1, and by heating to 290° C. in an autoclave according to our procedure, the conversion of butyl alcohol has been increased from 28% to 55%, and an increase from 25% to 49% in the yield of 2-ethylhexyl alcohol on total butanol has been attained.

Similarly, by the use of a molar ratio of 3.3:1:.5 the conversion of butyl alcohol, has been increased from 14% to 35% and an increase from 12% to 32% in the yield of 2 ethylhexyl alcohol on total butanol has been obtained.

Moreover, by the use of a molar ratio of 3.3:1:.6, the conversion of butyl alcohol which, by the procedure of aforestated British Patent, amounts to 44%, can be increased according to our procedure up to 70% of theoretical value.

A further advantage of our procedure consists in the fact that either solid NaOH or solid KOH can be used, with nearly similar results in respect to the yield of required alcohol. And this is possible only by the use of a previously formed alcoholate.

The economics of the process can thus be materially improved, since at the same degree of purity, the percentage of sodium hydroxide is far lower than that of potassium hydroxide.

In addition to the above advantages, a remarkable improvement is obtained even in the stability of process, i. e. as regard to the reproducibility of results. While, as already stated, the results which can be obtained according to British Patent No. 655,864, range always within more or less wide limits, by our procedure, due to the use of a previously prepared alcoholate, a closer control can be exerted on the course of the intricate reaction, whereby an exact reproducibility of results is obtained.

Further test results have also proved that by the use of previously formed alcoholates, the time required for the completion of condensation reaction at 290°–300° C. can be remarkably cut down.

In fact the reaction time which, according to British Patent No. 655,864, amounts to five hours, can be decreased to three hours, even when NaOH is utilized, and without any decrease in the yield of 2-ethylhexyl alcohol.

Our tests have proved that, when the procedure as claimed in the aforestated British patent is followed, a formation of butyric acid cannot be wholly avoided in the condensation of butyl alcohol; however, there exists the possibility of having said formation cut down to an almost negligible value, about 1% of the theoretical value.

The same results can be arrived at, according to our procedure, by the use of a previously formed alcoholate, even when NaOH is utilized in the preparation thereof. This is of particular importance in those countries where butyric acid is available in small quantities only.

The modes through which our process can be carried into practice will best be understood from the following examples.

*Example 1*

244 g. of finely subdivided, technically pure (85–90%) KOH, were charged into suitable equipment, comprising an agitator and a fractionating column. Then, after the addition of 980 g. of n-butylalcohol, the whole charge was subjected to a slow azeotropic distillation. In the course of such operation, the water was distilled off, together with the excess of butyl alcohol, while the potassium butylate was being formed, until the quantity of alcoholate attained the amount of 90–95% of theoretical value, in respect to potassium charged.

The butyl alcohol, after separation of water, was recirculated, i. e. added again to reaction mixture.

At last, the hot, semisolid mixture was transferred into a steel autoclave of a capacity of 5 liters and provided with an agitator, whereupon butyl alcohol was added in such an amount that the total weight of mixture was =1,010 g. Then 920 g. of butyl borate (obtained with nearly theoretical yields from the corresponding amounts of boric acid and n-butyl alcohol) were added; the autoclave was heated to 285–295° C. and kept for 5 hrs. at such temperature.

The max. pressure attained during such operation has been of 55 atm., while after the cooling, the residual pressure was about 12 atm., nearly all due to hydrogen developed in the course of reaction.

The different substances were brought into reaction in the following molar ratio:

$$C_4H_9OH:KOH:B(OC_4H_9)_3 = 3.4:1.1:1$$

After the cooling, the partly crystalline contents of the autoclave was taken-up with water, and the potassium metaborate was filtered-off. The filtrate then showed two layers: an upper layer containing the alcohols, and a bottom layer consisting of an aqueous solution of the acids formed, under the form of their potassium salts. The butyric acid can be recovered from the bottom layer by a suitable acidification. The upper layer was submitted to a fractional distillation, for the recovery of the non-converted butyl alcohol, the 2-ethylhexyl alcohol and possibly of the small amounts of the esters of said two alcohols with butyric acid.

Yields:

859.4 g. of n-butyl alcohol, corresponding to a conversion of 54.5% of total butyl alcohol as charged in the reaction.

810.8 g. of 2-ethylhexyl alcohol, corresponding to a yield of 48.6% on total butanol (gross yield), and of 89.3% on the converted butanol (net yield).

Moreover, 7.4 g. of n-butyric acid, corresponding to a gross yield of .3% and to a net yield of .6%, could be recovered from the aqueous bottom layer. However, the quantity of butyric acid present is always so small that its recovery might be omitted.

*Example 2*

A steel autoclave similar to that of Example 1, i. e. with a capacity of 5 l., and provided with a magnetically driven agitator, was used also in this example. However, in the case in question, much greater amounts of KOH, as well as of previously prepared alcoholate, in respect to butyl borate added, were charged, thereby materially increasing the reaction rate, and thus also the conversion of n-butyl alcohol. At the same time, however, a remarkable amount of butyric acid was formed, due to excess of alkali, which could not be neutralized by the boric acid formed.

Thus, a non-negligible decrease in the total yield of 2-ethylhexyl alcohol was suffered. As in the preceding example, the potassium butylate was previously prepared from 244 g. of KOH (85-90%) and 969 g. of n-butyl alcohol.

To such potassium alcoholate, prepared in the form of a suspension in n-butyl alcohol, 552 g. of butyl borate (equivalent to 533 g. of n-butyl alcohol) were added, and the autoclave contents was heated to 290°-295° C. Thus, 1,502 g. of n-butyl alcohol were present in total.

The reaction components were present in the hereinafter stated molar ratio:

$$C_4H_9OH:KOH:B(OC_4H_9)_3 = 3.3:1.1:.6$$

The further processing of the product discharged from the autoclave after the completion of reaction, was performed as in the preceding example.

Yields:

474 g. of n-butyl alcohol (as recovered from the alcoholic upper layer), which correspond to a conversion of 68.4% of total butyl alcohol.

746.3 g. of 2-ethylhexyl alcohol, which corresponds to a yield of 56.6% of total butanol, and to a net yield of 82.7%.

60 g. of butyric acid, corresponding to a gross yield of 3.4%, and to a net yield of 5%, could be recovered from the bottom aqueous layer.

*Example 3*

The corresponding amount of sodium alcoholate was obtained from 40 g. of technical NaOH (97-98%) and 244 g. of normal butyl alcohol, by means of azeotropic distillation in a steel autoclave of 1 liter, as stated in the preceding examples. To the suspension of sodium butylate (ab. 85-90% of theoretical amount) in n-butyl alcohol, 230 g. of n-butyl borate (equivalent to 222 g. of butyl alcohol) were added, whereupon the autoclave was heated to 300° C. and kept at that temperature for 3 hrs.

The molar ratio of reactants was as follows:

$$C_4H_9OH:NaOH:B(OC_4H_9)_3 = 3.3:1:1$$

The alcoholic and aqueous layers were then processed as hereinbefore stated, whereby the following yields were obtained:

243.7 g. of recovered n-butyl alcohol, equivalent to a conversion of 47.7% of the total butyl alcohol.

163.3 g. of pure 2-ethylhexyl alcohol, equivalent to a yield of 39.9% on total butanol, and to a net yield of 83.5%.

3.1 g. of butyric acid, equivalent to a gross yield of .6%, and to a net yield of 1.1%.

*Example 4*

This test was carried out in the same autoclave of Example 3, and also with technical NaOH; however, the molar rate of reactants was as follows:

$$C_4H_9OH:NaOH:B(OC_4H_9)_3 = 3.3:.5:.5$$

The lower addition of previously prepared alcoholate resulted in a decreased reaction rate, and thus also in a lower conversion of n-butyl alcohol.

The alcoholate was first prepared by azeotropic distillation of 20 g. of finely subdivided NaOH (97-98%) together with 245 g. of n-butyl alcohol whereupon, after cooling, 115 g. of butyl borate were added. The total quantity of free and esterificated butyl alcohol was thus of 356 g. The reaction mixture was then heated for 5 hrs. to 290° C.

After the conventional processing of final products, 237 g. of n-butyl alcohol corresponding to a consumption of 119 g. of butyl alcohol, and thus to a conversion of 33.2%, were obtained from the upper alcoholic layer. Moreover, 93.2 g. of pure 2-ethylhexyl alcohol were obtained, which corresponds to a yield of 29.8%, as calculated on the total butanol, and to a net yield of 89.8%.

2.5 g. of butyric acid, equivalent to a gross yield of .6% and to a net yield of 1.8%, were recovered from the bottom aqueous layer.

What we claim is:

1. In a process for the production of higher alcohols from lower alcohols, according to the Guerbet condensation, the improvement comprising reacting an alkali hydroxide with a lower alcohol selected from the group consisting of primary and secondary butyl and amyl alcohols, whereby there is obtained a product comprising a reaction mixture of alcoholate and alcohol, subjecting said reaction mixture to azeotropic distillation, whereby water is removed, and until an alcoholate content of 85 to 95 percent of the theoretical value has been obtained, and reacting said product with a boric ester of said lower alcohol.

2. A process according to claim 1 wherein the lower alcohol is n-butyl alcohol.

3. A process according to claim 1 wherein the alkali hydroxide is sodium hydroxide.

4. In a process for the production of higher alcohols from lower alcohols, according to the Guerbet condensation, the improvement comprising reacting an alkali hydroxide with a lower alcohol selected from the group consisting of primary and secondary butyl and amyl alcohols, whereby there is obtained a product comprising mixture of alcoholate and alcohol, subjecting said reaction mixture to azeotropic distillation, whereby water is removed, and until an alcoholate content of 85 to 95 percent of the theoretical value has been obtained, and reacting said product with a boric ester of said lower alcohol, the proportions of said reactants being approximately 1.1 to 0.5 mols of said alkali hydroxide, 3.4 to 3.3 mols of said lower alcohol, and 1.0 to 0.5 mols of said boric ester.

5. A process according to claim 4 wherein the lower alcohol is n-butyl alcohol.

6. A process according to claim 4 wherein the alkali hydroxide is sodium hydroxide.

References Cited in the file of this patent

UNITED STATES PATENTS 2,762,847    Miller et al. _____ Sept. 11, 1956

FOREIGN PATENTS 655,864    Great Britain _____ Aug. 1, 1951

UNITED STATES PATENT OFFICE

CERTIFICATE OF CORRECTION

Patent No. 2,861,110 November 18, 1958

Jean Herzenberg et al.

It is hereby certified that error appears in the above numbered patent requiring correction and that the said Letters Patent should read as corrected below.

Column 3, line 35, for the ratio of "3.3:1:.5" read -- 3.3: .5:.5 --.

Signed and sealed this 31st day of December 1963.

(SEAL)
Attest:
ERNEST W. SWIDER

Attesting Officer

EDWIN L. REYNOLDS

Acting Commissioner of Patents